Nov. 17, 1964 T. H. KRUEGER ETAL 3,157,550

METHOD OF PREPARING AND APPLYING SEALING TAPE

Original Filed April 15, 1957 2 Sheets-Sheet 1

INVENTOR.
Nicholas Campanaro
Theodore H. Krueger
BY
Moses, Nolte & Nolte.
ATTORNEYS.

METHOD OF PREPARING AND APPLYING SEALING TAPE

Original Filed April 15, 1957 2 Sheets-Sheet 2

INVENTOR.
Nicholas Campanaro
Theodore H. Krueger
BY
Moses, Nolte & Nolte.
ATTORNEYS.

United States Patent Office 3,157,550

Patented Nov. 17, 1964

3,157,550

METHOD OF PREPARING AND APPLYING SEALING TAPE

Theodore H. Krueger, Shelton, Conn., and Nicholas Campanaro, Newton Centre, Mass., assignors to Better Packages, Incorporated, Shelton, Conn., a corporation of New York Original application Apr. 15, 1957, Ser. No. 652,953, now Patent No. 3,037,477. Divided and this application Apr. 17, 1962, Ser. No. 188,142

4 Claims. (Cl. 156—320)

This application is a division of an application for U.S. patent filed by us April 15, 1957, Serial No. 652,953, now Patent No. 3,037,477.

This invention relates to methods for dispensing, preparing and applying gummed tape used for sealing boxes or packages and especially for tape used for sealing fibreboard shipping cases. It is particularly applicable to the use of reinforced tape which is so stiff as to present difficulties in handling unless softened by heating.

Reinforced tapes for this purpose usually comprise two plies of paper bonded together with adhesive, usually a low softening point asphalt, in which are embedded fibres of nylon, cellulose acetate or fibre glass. One outer face of this laminated tape is then coated with the usual water soluble adhesive for attaching the tape to the shipping case. Strips of this tape are usually applied over the full length of the center seam of the box and bend down at the ends so as to overlap at least two inches on the vertical ends of the box.

While the reinforced tape is somewhat more expensive than the single ply tape, its use was expected to give substantial economies because cross strips were not required. This not only required less tape but also was expected to result in a substantial saving in labor. The resulting sealed container was also expected to be stronger than the box sealed with the multiple strips of the older single ply tape. In actual practice, however, the use of the reinforced tape did not result in the anticipated advantages.

The expected labor saving did not materialize when customers started using the reinforced tape because it actually required much more time and manipulation to get tight adhesion between the new tape and the box. Also if the tape did not adhere quickly and very tightly, the valuble contents of the case was endangered during its journey on railroads, etc. where it gets quite rough handling.

We have discovered that the reason why the tape adhesion of this reinforced tape is so often unsatisfactory is because the reinforced tape is so stiff. The flaps of a fibre case seldom lie in the same flat plane, and each flap itself is not perfectly flat. The older tapes were so pliable that a quick rubbing made them conform to the irregularities in the box surfaces. This, the new reinforced tapes do not do. Due to its inherent stiffness the tape "bridges over" depressions in the box surface so that the gum even though properly moistened touches those depressions only momentarily and immediately pulls loose again at those depression points. The result, of course, is that only parts of the tape are holding the box flaps. This can make the box unsafe even though it looks tightly sealed. The defect is therefore not discovered until the box arrives in damaged condition at its destination.

Even greater is the difficulty caused by the non-adhesion of the two overlap-ends of the tape strip. Normal rubbing is not sufficient to make them adhere dependably to the vertical ends of the box. Packers must rub them down repeatedly and even then they often "pop up" a few seconds or minutes later.

In accordance with our invention these difficulties in the use of stiff reinforced tape are overcome by the provision of means for properly softening the tape as it is being dispensed so that it is sufficiently pliable to be readily caused to adhere over the longitudinal seams between the box flaps and may be properly bent or creased down over the vertical box ends.

In preferred embodiments of the invention the entire length of tape dispensed is heated to a certain extent and the end portions of the tape strips, which are to be bent down, are heated and softened to a greater extent. The means for heating the tape may be incorporated in various types of tape dispensers and are so arranged that the desired heating of the tape is accomplished without change in the normal dispensing cycle and without delaying the operation.

In the accompanying drawings in which one typical form of dispenser by which the methods of the present invention may be practiced is illustrated:

Figure 1:
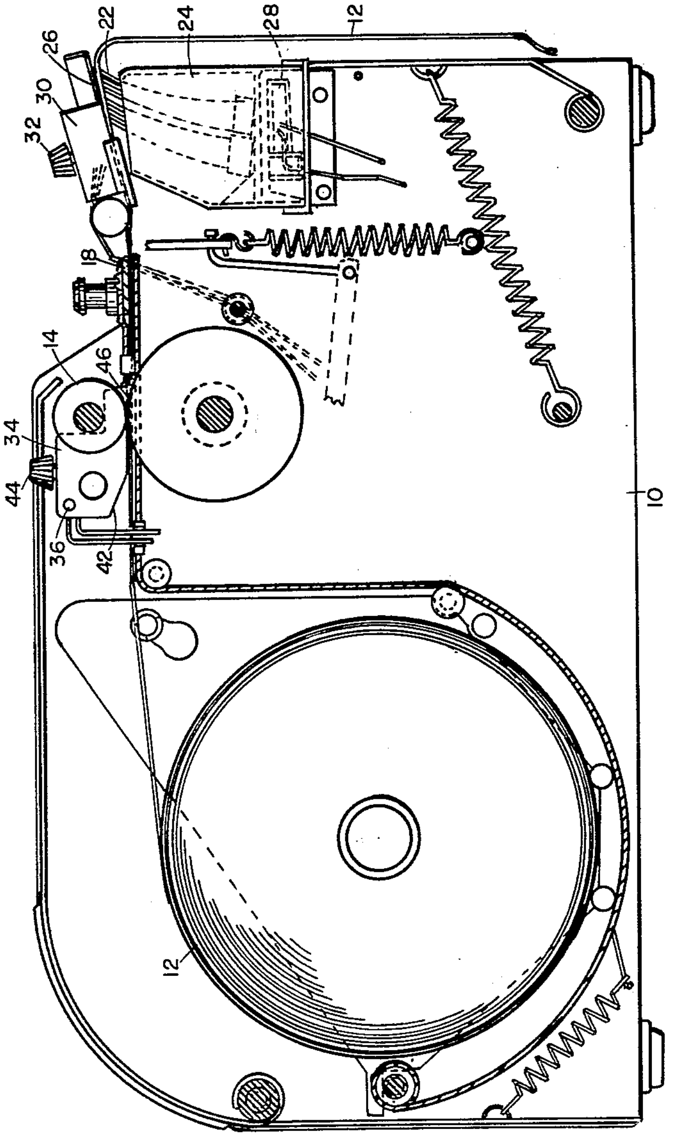
FIG. 1 is a vertical longitudinal sectional view of the dispenser with the tape softening means incorporated therein.

Referring to the drawings in detail, FIG. 1 shows a dispenser having a casing 10 in which is mounted a roll of tape 12. The tape is drawn from the roll and dispensed by means of a pair of feed rolls 14 and 16 between which the tape passes. The rolls may be driven by hand or power in any well known manner, the roll driving mechanism not being illustrated. The tape is pushed over a horizontal blade 18 and is severed by vertically moving blade 20 which may be operated by any conventional mechanism. After passing the cutoff mechanism and before the tape is severed, the tape is pushed through the moistening couple comprising the moistening brushes 22 which are mounted in a water tank 24 and the pivoted pressure plate 26 which presses the tape against the brushes. Any other suitable tape moistening means may be employed.

In the particular machine illustrated, the water tank has a heater 28 therein for warming the water in the tank so as to enable it to penetrate the gum more rapidly. This water heater, however, does not supply sufficient heat to heat or soften the tape and is not a part of the present invention.

In the construction shown, two tape heating elements are provided which have particular functions as will be explained. However, for some purposes it might be sufficient to utilize only a single heating element for the tape. As the tape is fed out of the machine by the dispensing rolls, it passes under the heating element or elements so that it is raised in temperature, softened and made more pliable.

In the preferred construction illustrated, two tape heaters are employed. The first of these, 30, is shown as mounted on the pressure plate 26. It comprises an electrical heat element of any suitable type mounted on the plate and serving to heat the latter. It is preferably provided with a suitable thermostat controlled by a knob 32 so that the temperature of the heater and pressure plate may be regulated. In the present instance, the second heater is shown as 34, this heater being in the form of an electrically heated block or box which is pivotally mounted on the pivot shaft 36 and which has a heater shoe 38 arranged to overlie the tape table 40 over which the tape is fed. The lower surface of the heater block is preferably beveled as indicated at 42 so as to permit the tape to be readily fed between the heater block and the tape table 40.

The heater 34 is provided with a thermostat which may be adjusted by means of a knob 44.

The use of the two heating elements 30 and 34 enables tape strips to be delivered which are heated and softened more in the zones thereof which are to be creased or bent over the vertical box ends than the rest of the strip. This result is accomplished in the course of the usual dispensing cycle in the following manner.

Figure 4:
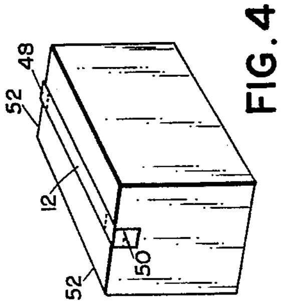
FIG. 4 is a perspective view of a box with the reinforced strip applied thereto.
Figure 3:
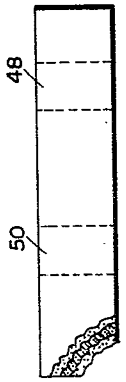
FIG. 3 is a diagrammatical plan view showing a piece of tape ready to be applied to a box, indicating the zones which have been heated to the higher degree than the rest of the strip.
Figure 2:
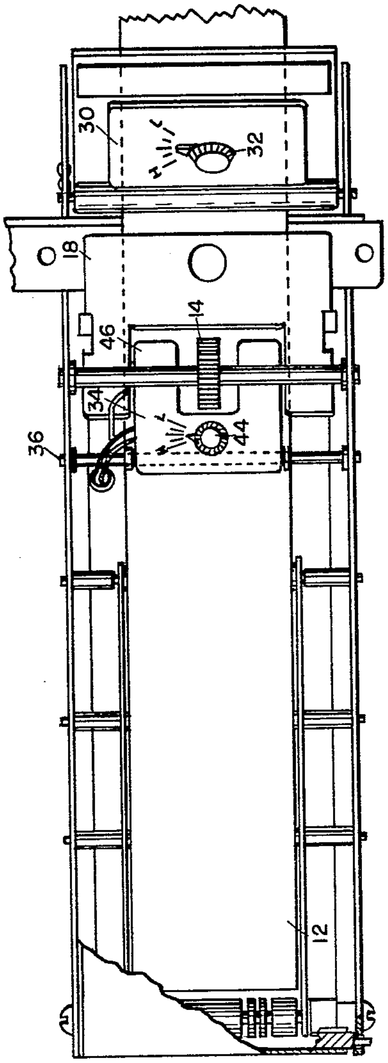
FIG. 2 is a plan view of the dispenser shown in FIG. 1.

At the time that a strip is about to be dispensed for application to a box, the previously dispensed strip will have been withdrawn from under the pressure plate 26 and applied to the previous box. The end of the strip coming from the roll stands even with the cutter blade 18 where the previous strip was severed. The portion of the strip under the heater shoe 38 is now being heated. Usually the shoe is of such shape that as it swings downward around the pivot shaft 36 it will rest on the strip at its forward corner 46, the remainder of the face of the shoe being slightly inclined and spaced from the strip. Heat is applied to the strip from such shoe face mainly by radiation. The portion of the strip below the shoe thereby becomes thoroughly heated and softened. The tape will stand in this position upntil the commencement of the dispensing operation, but the temperature of the shoe is regulated so that the tape will not be damaged, even though it may stand for an indefinite period. The operator now actuates the dispenser to dispense the strip of tape, and the strip is immediately fed forward through the moistening couple and is subjected to a uniform low rate of heat as it passes rapidly under the pressure plate. The forward end of the strip which stood under the shoe 38, however, is heated more highly than the intermediate part of the strip which is heated only as it moves. When the desired length of strip has been fed, the feed is stopped and the cutter operates to cut the strip off, and the strip will then hang by its rear end which is supported between the brush and the pressure plate. The strip will hang in this position until the operator is ready to remove it to apply to the next packing case, which he has meanwhile manipulated by closing the box flaps. Ordinarily, the strip may hang in this position for perhaps three seconds before the operator is ready to remove and apply it. During this period of time the rear end of the strip remains in contact with the heated pressure plate 26, so that it becomes additionally heated and softened. The forward end of the strip which is hanging down in front of the machine has already been fully softened as described. Thus the strip which the operator takes from the machine to apply to the box is in the condition indicated by the diagram, FIG. 3, in which all of the strip has been moderately heated so as to have some degree of flexibility and may be readily applied to adhere to the surfaces of the box along the seam while the two end zones of the strip indicated at 48 and 50, FIG. 3, are heated to a considerably higher degree and rendered softer than the rest of the strip. These zones correspond with the corners of the box indicated at 52 in FIG. 4, so that the end flaps of the strip may be readily bent down and sealed against the vertical ends of the box.

The temperatures of the two heaters may be separately regulated by their thermostat knobs so as to secure the temperatures which are most satisfactory. Ordinarily, the pressure plate heater is adjusted to a slightly higher temperature than that of the heater over the tape table. This is so because the tape normally stands longer in the position in which its end is heated by the tape table heater, than it will stand in the position where it is hanging down with its rear end held between the pressure plate and moistening brush. Adjustment of the temperature of the heaters is also desirable to allow for changes in ambient temperatures. In a hot room less heat would have to be applied than in a cold one. Temperatures would also be adjusted depending upon the nature of the reinforcing layer used between the plies of the reinforced tape.

What we claim is:

1. The method of sealing the flaps of shipping cases with pieces of laminated tape having water softening adhesive coatings on the surfaces thereof and having reinforcing layers including heat softenable material causing the tape to have greater flexibility when heated, said strips being longer than the flap edges, which consists in feeding the strips intermittently over moistening means for moistening the adhesive coatings, heating the end portions of the strips while stationary prior to application of the strips to the shipping case, manually applying the strips to successive shipping cases, permanently sealing the same thereto by the action of the water softened adhesive, and bending down the heated end portions of the strips and sealing them to the ends of the shipping cases also by the water softened adhesive, the water softened adhesive constituting the sole means for permanently sealing the shipping case flaps.

2. The method of sealing a shipping case with a laminated tape having a water softenable adhesive constituting the sole means for holding the tape to the case, said tape having an intercalated layer providing thermoplastic properties therefor causing the tape to have greater flexibility when heated, comprising feeding the tape across heating means to soften said layer so as to decrease the stiffness of the tape and, while heated, across moistening means to render the water softenable coating on the tape adhesive, and pressing the tape into adhesion with the case where, upon causing drying, it is permanently adhered.

3. A process for sealing packages which consists in providing a multilayer sealing strip having an intermediate layer comprising reinforcing filaments embedded in a heat softenable layer, the strip having a water softenable gum on one face thereof, said process including the following steps:

(*a*) feeding a length of strip, (*b*) heating the strip before and during feeding to reduce its stiffness, (*c*) moistening the gum on the heated strip during feeding, and (*d*) applying the heated moistening strip to the package for sealing the same.

4. A process as claimed in claim 3, in which zones near the ends of a length of strips to be fed are heated before feeding the strip.

References Cited in the file of this patent

UNITED STATES PATENTS

| | | |
|---|---|---|
| 1,953,183 | McLaurin | Apr. 3, 1934 |
| 2,235,704 | Garbatenka et al. | Mar. 18, 1941 |
| 2,538,520 | Holt et al. | Jan. 16, 1951 |
| 2,776,606 | Fischer et al. | Jan. 8, 1957 |
| 2,964,065 | Haroldson et al. | Dec. 13, 1960 |